(12) United States Patent
Felber et al.

(10) Patent No.: US 11,539,693 B2
(45) Date of Patent: Dec. 27, 2022

(54) METHOD FOR PROVIDING RANDOM NUMBERS FOR CONTROL UNITS OF A VEHICLE NETWORK, AND VEHICLE NETWORK FOR PERFORMING SAID METHOD

(71) Applicant: Continental Teves AG & Co. oHG, Frankfurt am Main (DE)

(72) Inventors: Peter Felber, Darmstadt (DE); Bernhard Jungk, Ulm (DE); Marc Sebastian Patric Stöttinger, Oestrich-Winkel (DE)

(73) Assignee: Continental Teves AG & Co. oHG

( * ) Notice: Subject to any disclaimer, the term of this patent is extended or adjusted under 35 U.S.C. 154(b) by 812 days.

(21) Appl. No.: 16/347,303

(22) PCT Filed: Nov. 21, 2017

(86) PCT No.: PCT/EP2017/079862
§ 371 (c)(1),
(2) Date: May 3, 2019

(87) PCT Pub. No.: WO2018/099760
PCT Pub. Date: Jun. 7, 2018

(65) Prior Publication Data
US 2019/0286421 A1   Sep. 19, 2019

(30) Foreign Application Priority Data

Nov. 29, 2016   (DE) .................... 10 2016 223 695.4

(51) Int. Cl.
*H04L 9/40*   (2022.01)
*G06F 7/58*   (2006.01)
(Continued)

(52) U.S. Cl.
CPC ............ *H04L 63/0876* (2013.01); *G06F 7/58* (2013.01); *G06F 7/582* (2013.01); *G06F 7/588* (2013.01);
(Continued)

(58) Field of Classification Search
CPC .................... G06F 7/58; H04L 9/0643; H04L 9/065–0668; H04L 9/0861–0877
(Continued)

(56) References Cited

U.S. PATENT DOCUMENTS 6,297,567 B1   10/2001   Yano
8,014,523 B2   9/2011   Näslund
(Continued)

FOREIGN PATENT DOCUMENTS

CN   102084336 A   3/2011
JP   2000025574 A   1/2000
(Continued)

OTHER PUBLICATIONS

Korean Decision for Grant of Patent for Korean Application No. 10-2019-7015260, dated Nov. 3, 2020, with translation, 3 pages.
(Continued)

*Primary Examiner* — Emily E Larocque
(74) *Attorney, Agent, or Firm* — RatnerPrestia

(57) ABSTRACT

A method for providing random numbers for control units communicating via a vehicle network, in which a random number generator having an aggregation component, a storage unit and a distribution component is provided. A plurality of control units each with at least one entropy source are formed. Their raw data are transmitted to the aggregation component via the vehicle network. A quality assurance of the combined raw data from the entropy sources is carried out using only those combined raw data which both occur in a non-deterministic manner and contain a minimum degree
(Continued)

of entropy as qualified raw data. The qualified raw data are converted into an aggregated data block by a cryptographic one-way function and securely stored as a random number in the storage unit. The random number stored in the storage unit is transmitted to a control unit via the vehicle network by the distribution component.

20 Claims, 2 Drawing Sheets

(51) Int. Cl.
    *G06F 13/38* (2006.01)
    *H04L 9/06* (2006.01)
    *H04W 4/48* (2018.01)
    *H04W 12/06* (2021.01)

(52) U.S. Cl.
    CPC ............ *G06F 13/38* (2013.01); *H04L 9/0643* (2013.01); *H04W 4/48* (2018.02); *H04W 12/06* (2013.01)

(58) Field of Classification Search
    USPC .................................................. 708/250, 255
    See application file for complete search history.

(56) References Cited

U.S. PATENT DOCUMENTS

| | | |
|---|---|---|
| 8,015,224 B1 | 9/2011 | Chaichanavong et al. |
| 8,189,778 B2 | 5/2012 | Zhang |
| 8,315,383 B2 | 11/2012 | Seroussi et al. |
| 8,989,386 B2 | 3/2015 | Falk |
| 2008/0256151 A1 | 10/2008 | Acar et al. |
| 2009/0165086 A1 | 6/2009 | Trichina et al. |
| 2009/0323967 A1 | 12/2009 | Peirce et al. |
| 2010/0106756 A1 | 4/2010 | Ellison |
| 2010/0195829 A1* | 8/2010 | Blom ...................... G06F 7/588 380/255 |
| 2011/0047545 A1 | 2/2011 | Ellison et al. |
| 2014/0136583 A1 | 5/2014 | Hyde et al. |
| 2015/0006601 A1 | 1/2015 | Aissi et al. |
| 2015/0117636 A1 | 4/2015 | Best et al. |
| 2015/0263854 A1 | 9/2015 | Sakumoto et al. |
| 2015/0301803 A1 | 10/2015 | Boenisch et al. |
| 2016/0028544 A1* | 1/2016 | Hyde ...................... H04L 9/085 711/112 |
| 2016/0099806 A1 | 4/2016 | Racklyeft et al. |
| 2016/0342394 A1 | 11/2016 | Tsirkin |
| 2017/0168776 A1* | 6/2017 | Boenisch .............. H04L 9/3247 |

FOREIGN PATENT DOCUMENTS

| | | |
|---|---|---|
| JP | 2005526299 A | 9/2005 |
| JP | 2012093635 A | 5/2012 |
| KR | 20080073315 A | 8/2008 |
| KR | 20130045260 A | 5/2013 |
| KR | 20160105511 A | 9/2016 |

OTHER PUBLICATIONS

Notice of Reasons for Refusal for Japanese Application No. 2019-528722, dated Aug. 31, 2020, with translation, 10 pages.
German Search Report for German Application No. 10 2016 223 695.4, dated Oct. 6, 2017, with partial translation, 12 pages.
International Search Report and Written Opinion for International Application No. PCT/EP2017/079862, dated Feb. 16, 2018, 9 pages.
Chinese Office Action for Chinese Application No. 201780071616.X, dated Aug. 26, 2022, 8 pages.

* cited by examiner

METHOD FOR PROVIDING RANDOM NUMBERS FOR CONTROL UNITS OF A VEHICLE NETWORK, AND VEHICLE NETWORK FOR PERFORMING SAID METHOD

CROSS REFERENCE TO RELATED APPLICATIONS

This application is the U.S. National Phase Application of PCT International Application No. PCT/EP2017/079862, filed Nov. 21, 2017, which claims priority to German Patent Application No. 10 2016 223 695.4, filed Nov. 29, 2016, the contents of such applications being incorporated by reference herein.

FIELD OF THE INVENTION

The invention relates to a method for providing random numbers for control units communicating via a vehicle network. The invention also relates to a vehicle network for performing the method according to the invention.

BACKGROUND OF THE INVENTION

In recent years, vehicles have been equipped with a multiplicity of vehicle-based control units (ECU) (electronic control units) for controlling the respective functional units. The ECUs are each connected to one another via vehicle-based networks (vehicle network) in order to cooperate. Software-based applications, which implement corresponding functionalities in interaction with suitable hardware, are generally used to control these ECUs and for the communication between these ECUs. In this case, the protection of such applications from unauthorized access is playing a role more and more. Therefore, there is an increased need for cryptographically secure random numbers for the secure communication of these ECUs with one another and with an external communication partner (for example servers or other vehicles) and for key exchange protocols. These random numbers must be available within a very short time after the vehicle is started (generally within 100 ms).

In deterministic systems of network nodes such as microcontrollers, it is generally very difficult to collect sufficient entropy to generate random numbers. This also applies, in particular, to vehicle networks having control units which contain such microcontrollers.

It is known practice to respectively install true random number generators (TRNG) in the individual control units for the purpose of generating secure random numbers, which true random number generators are intended to tackle the requirement for the quick provision of random numbers. However, these true random number generators often cannot provide good random numbers quickly enough after the starting process and also increase the costs of each ECU.

An important feature of a random number generator (RNG) is its entropy, that is to say the randomness and unpredictability of the random numbers generated by a random number generator.

An entropy source, that is to say a system which operates in a non-deterministic manner and determines the available "randomness" (entropy), is used to implement a random number generator. An extraction mechanism for measuring the randomly fluctuating variable from the entropy source, with which as much entropy as possible is intended to be "collected", is also required. Finally, these raw data provided by the entropy source are preprocessed in order to compensate for deficiencies in the entropy source or the extraction mechanism.

SUMMARY OF THE INVENTION

An aspect of the invention is a method for providing secure random numbers for control units communicating via a vehicle network for cryptographic use in components inside the vehicle, which method is available within a very short time after a vehicle has been started and can be implemented in a cost-effective manner. An aspect of the invention is also a vehicle network for performing the method according to the invention.

This method according to an aspect of the invention for providing random numbers for control units communicating via a vehicle network has the following method steps of:

a) providing a random number generator which is connected to the vehicle network for the purpose of transmitting random numbers to the control units, wherein the random number generator has an aggregation component, a storage unit and a distribution component, b) forming a plurality of control units each with at least one entropy source, wherein the raw data generated by the entropy sources are transmitted to the aggregation component of the random number generator via the vehicle network for the purpose of generating random numbers, c) combining the raw data transmitted from the entropy sources to the aggregation component, d) carrying out a quality assurance of the combined raw data from the entropy sources by using only those combined raw data which both occur in a non-deterministic manner and contain a minimum amount of entropy as qualified raw data, e) post-processing the qualified raw data by converting them into an aggregated data block by means of a cryptographic one-way function, f) securely storing the aggregated data block as a random number in the storage unit, and g) transmitting a random number stored in the storage unit to a control unit via the vehicle network by means of the distribution component.

This method according to an aspect of the invention provides a vehicle network having ECUs, in which secure random numbers are generated from different entropy sources and are stored in a persistent, confidential and tamper-proof manner in a random number generator as a central network component of the vehicle network, with the result that this holding of secure random numbers in the storage unit results in random numbers with sufficient entropy being available in the case of short starting times of the vehicle network, which random numbers are made available to the other control units for cryptographic operations via the vehicle network.

With such holding of secure random numbers in the storage unit of the random number generator, the control units do not require any individual random number generators, thus making it possible to reduce the costs of the vehicle network. In addition, the centralized architecture with respect to the generation of random numbers by means of the central random number generator simplifies the subsequent addition of further entropy sources or changes to the software of the random number generator, for example during security updates.

According to one advantageous development of an aspect of the invention, each random number is transmitted only once according to method step g in order to avoid the repeated use of random numbers.

Another advantageous configuration provides for the random number generator to also be formed with at least one entropy source. With the increasing number of entropy sources, the randomness and unpredictability of the random numbers generated therefrom can be improved.

According to one advantageous configuration of an aspect of the invention, the measurement inaccuracies of sensors used in the vehicle are used as entropy sources. These preferably relate to an engine speed sensor and/or a sensor capturing the steering movements of a steering wheel of the vehicle and/or a radar sensor and/or at least one light sensor and/or a sensor capturing the position of the brake pedal of the vehicle.

When using sensors as entropy sources, their measurement inaccuracies are measured and are digitized as a bit number, wherein the n least significant bits of the bit number are used as raw data.

Furthermore, according to a development, bus signals from a data bus of the vehicle and/or control signals from a control system of the vehicle can be used as entropy sources. In this respect, the period between two non-periodic messages of the same type on the data bus is preferably used as the entropy source.

Finally, according to a development, results of cryptographic calculations can be used as entropy sources. In this respect, hash sums and/or message authentication codes (MACs), signatures and/or encrypted data are preferably used as cryptographic calculations.

According to another advantageous development of an aspect of the invention, the quality assurance according to method step d is carried out using statistical analysis methods. For this purpose, use is made of a particular metric which ensures that the selected data occur in a non-deterministic manner and are otherwise rejected, that is to say the raw data provided by the entropy sources must be evenly distributed and must not contain any statistical skew or statistical patterns. These requirements are ensured by using known statistical analysis methods. In addition, the selected raw data are processed further only when they contain a certain minimum amount of entropy. For this purpose, the raw data checked for an even distribution are mixed and compressed by means of cryptographic hash functions in order to increase the entropy.

The secure storage of the generated random numbers as an aggregated data block according to method step f, before the distribution by means of the distribution component of the random number generator, is carried out using an encryption algorithm having a predefined operating mode. This ensures the confidentiality and integrity of the random numbers until used by the control units.

Such a vehicle network for providing random numbers, having a plurality of communicating control units, comprises the following components:
- a random number generator which is connected to the vehicle network for the purpose of transmitting random numbers to the control units, wherein the random number generator has an aggregation component, a storage unit and a distribution component,
- a plurality of control units each with at least one entropy source, wherein the raw data generated by the entropy sources can be transmitted to the aggregation component of the random number generator via the vehicle network for the purpose of generating the random numbers, wherein the aggregation component is designed to combine the raw data transmitted from the entropy sources and to subject them to a quality assurance by being able to use only those combined raw data which both occur in a non-deterministic manner and contain a minimum amount of entropy as qualified raw data, the aggregation component is designed to post-process the qualified raw data, according to which the latter can be converted into an aggregated data block by means of a cryptographic one-way function and this data block can be securely stored as a random number in the storage unit, and the storage unit is designed to transmit a stored random number to a control unit via the vehicle network by means of the distribution component.

This vehicle network according to an aspect of the invention also has the advantageous properties cited in connection with the method according to an aspect of the invention.

BRIEF DESCRIPTION OF THE DRAWINGS

The method according to an aspect of the invention will be described and explained below on the basis of exemplary embodiments of a vehicle network according to an aspect of the invention and with reference to the appended figures. In the drawing.

DETAILED DESCRIPTION OF THE PREFERRED EMBODIMENTS

Figure 1:
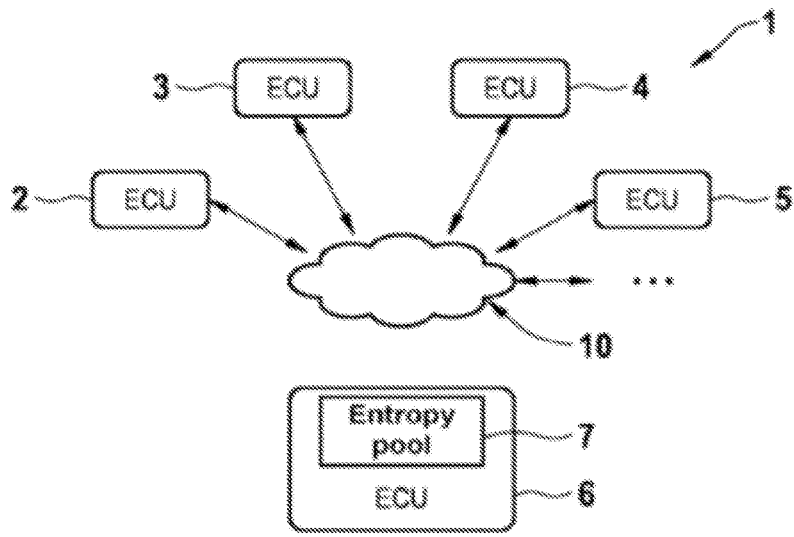
FIG. 1 shows a schematic illustration of an exemplary embodiment of the vehicle network according to an aspect of the invention for performing the method according to an aspect of the invention.

FIG. 1 shows the structure of a vehicle network 1 according to an aspect of the invention, which is used to implement the method according to an aspect of the invention for providing random numbers by means of this vehicle network 1.

This vehicle network 1 comprises a plurality of control units (ECU) 2, 3, 4 and 5 and a control unit 6 having a random number generator 7. These control units communicate with one another via a data bus 10, for example a CAN bus.

The random number generator 7, which is called an entropy pool below and is likewise denoted with the reference sign 7, is used to generate and hold random numbers in order to make them available to particular control units for cryptographic operations if necessary.

As indicated in FIG. 1 for example, such an entropy pool 7 can be integrated in a control unit 6 as a software component. An already existing control unit 6 or a control unit 6 implemented for this purpose can be used for this purpose.

Figure 2:
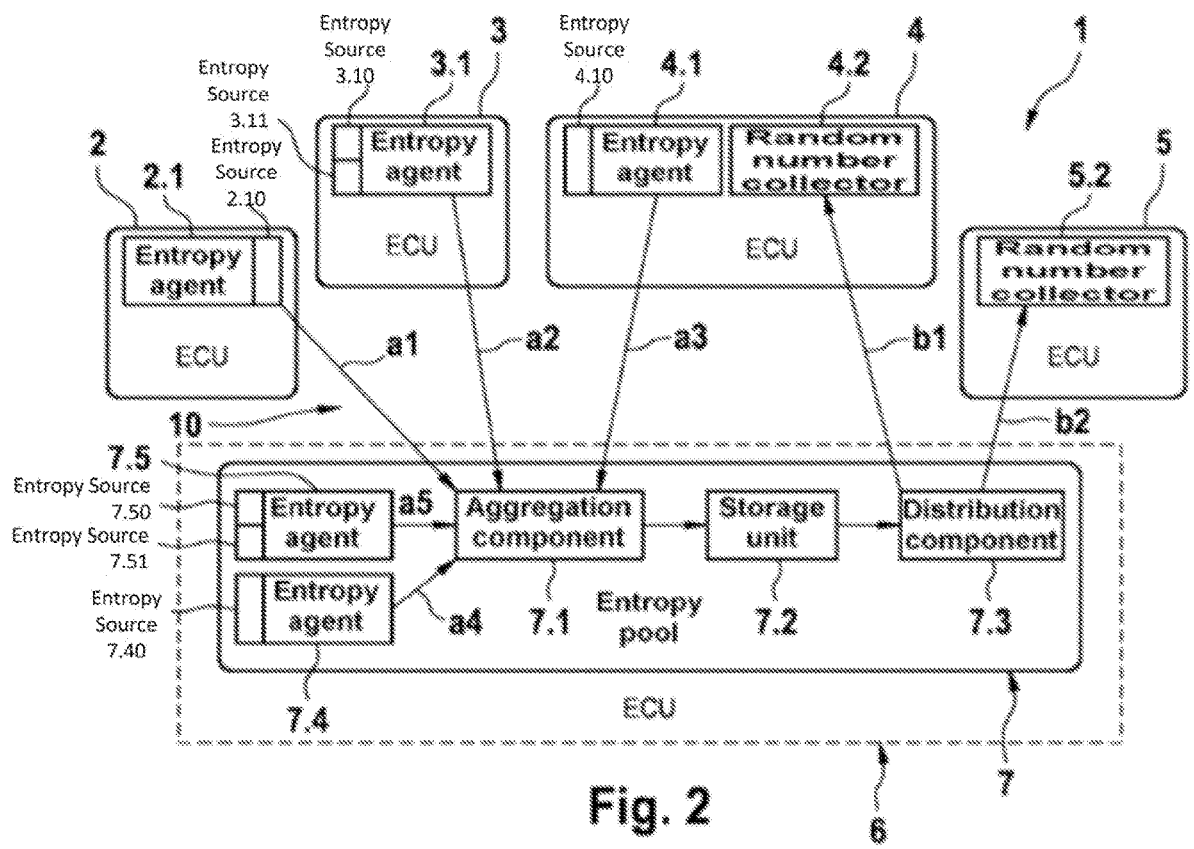
FIG. 2 shows a more detailed schematic illustration of the vehicle network according to FIG. 1.

FIG. 2 shows, in detail, the structure of the vehicle network 1. According to this, the entropy pool 7 comprises the following main components:
- an aggregation component 7.1,
- a storage unit 7.2 in the form of a secure store, and
- a distribution component 7.3.

According to FIG. 2, the entropy sources needed to generate random numbers are implemented in some control units, namely in the control units 2, 3 and 4, by virtue of these control units 2, 3 and 4 having an entropy agent as a component which contains at least one entropy source. The entropy agent 2.1 of the control unit 2 is therefore implemented with an entropy source 2.10, the entropy agent 3.1 of the control unit 3 is implemented with two entropy sources 3.10 and 3.11, and the entropy agent 4.1 of the control unit 4 is implemented with an entropy source 4.10.

In addition to the main components cited above, the entropy pool 7 also has two entropy agents 7.4 and 7.5 with an entropy source 7.40 and with two entropy sources 7.50 and 7.51, respectively.

The entropy agents 2.1, 3.1, 4.1 of the control units 2, 3 and 4 and the entropy agents 7.4 and 7.5 of the entropy pool 7 are connected to the aggregation component 7.1 of the entropy pool 7 via a unidirectional connection a1, a2 and a3 and a4 and a5. The raw data from the corresponding entropy sources of the entropy agents, which are needed to generate random numbers, are transmitted to this aggregation component 7.1 via these communication connections a1 to a5.

Those control units which need random numbers to carry out cryptographic calculations have a random number collector as a component. The control unit 4 therefore has a random number collector 4.2 and the control unit 5 has a random number collector 5.2. These random number collectors 4.2 and 5.2 are each connected to the distribution component 7.3 of the entropy pool 7 via a unidirectional connection b1 and b2. The random numbers stored in the storage unit 7.2 are transmitted to the random number collector 4.2 and to the random number collector 5.2 via these communication connections b1 and b2 by means of the distribution component 7.3.

It is clear from FIG. 2 that the vehicle network 1 has control units which are in the form of producers of entropy with an entropy agent and control units which occur only as consumers of random numbers and therefore comprise only a random number collector and no entropy agent. The two control units 2 and 3, as producers of entropy, are therefore equipped only with an entropy agent 2.1 and 3.1, whereas the control unit 5, as a consumer of random numbers, has only a random number collector 5.2. In contrast, the control unit 4 occurs both as a producer of entropy and as a consumer of random numbers and therefore has both an entropy agent 4.1 and a random number collector 4.2.

The unidirectional communication connections a1, a2 and a3 and b1 and b2 can be implemented via the data bus 10 or via a separate communication structure.

In order to create the random numbers, the entropy pool 7 uses both the entropy sources 2.10, 3.10 and 3.11 and 4.10 implemented in the corresponding control units 2, 3 and 4 and its own entropy sources 7.40, 7.50 and 7.51.

Different random events can be used to implement these entropy sources.

Such random events can be based on physical phenomena, for example analog measurement inaccuracies of sensors used in the vehicle. Since measurement inaccuracies generally arise as a result of non-deterministic environmental influences, they can be used as a source of entropy. The following sensors in the vehicle, for example, are suitable for this:
- engine speed sensor
- sensor for detecting steering movements
- radar sensor
- light sensors
- sensors for detecting the position of the brake pedal.

When using such sensors as entropy sources, their measurement inaccuracies are measured and are digitized as a bit number, wherein the n least significant bits of the bit number are used as raw data. If such raw data are transmitted to all network subscribers, for example on the data bus 10, these data can also be directly tapped off from the data bus 10 by the entropy agents 7.4 and 7.5 of the entropy pool and can be transmitted to the aggregation component 7.1 for further processing.

Events which occur in components of the vehicle network 1, for example in the data bus 10 or in a control system, for example a comfort system or an assistance system of the vehicle, can also be used as an entropy source.

When using the data bus 10, which is in the form of a CAN bus for example, the time which elapses between two non-periodic messages of the same type on the CAN bus can be predicted only with difficulty on account of the complex deterministic processes and can therefore be used as an entropy source. Such non-periodic messages can be classified in three different categories:
- time window between the occurrence of values of particular non-cyclic message types on the data bus, for example:
- time window for the occurrence of a particular braking value
- time between the raising and lowering of the window
- time window between the opening of the tank flap
- time in which a particular gear is used.
- time window between the sequence of particular values of a particular message or a sequence of a plurality of message types on the data bus, for example:
- time window between a particular braking value pattern
- particular shifting pattern of a sequence of gears and dwell time in the gears during the gear shift.
- duration of a particular sequence of message types on the data bus, which are independent of one another, without heeding the actual values of the message, for example:
- Particular pattern during starting: mixture of acceleration, gear, gasoline supply.

When using the control system of a comfort system, for example an air-conditioning system, as an entropy source, the difference between a desired value and an actual value, as measured in the controller, is captured.

Finally, it is also possible to use the results of cryptographic calculations as an entropy source since the results of cryptographic calculations usually have a high degree of entropy in order to ensure the security of the properties to be protected (confidentiality, integrity, authenticity). Examples of results of cryptographic calculations are:
- hash sums
- message authentication codes (MACs)
- signatures
- encrypted data.

In principle, the installation of an entropy agent at each point in the vehicle at which such cryptographic calculations are carried out is conceivable and is dependent on the vehicle manufacturer. Only those cryptographic methods and protocols in which a repetition of values is improbable should be used to generate entropy.

If, for example, the integrity of particular messages on the CAN bus is protected by means of message authentication codes, the corresponding messages can be directly identified on the basis of their object ID and tapped off by an entropy agent 7.4 or 7.5 within the entropy pool 7. The entropy agent 7.4 or 7.5 can then extract the MAC and forward it to the aggregation component 7.1.

If the communication between a control unit of the vehicle network 1 and the backend via the Internet is encrypted with protocols such as TLS, for example, an entropy agent within the control unit can use the ciphertext of the communication to obtain the entropy and can forward it to the aggregation component 7.1.

Figure 3:
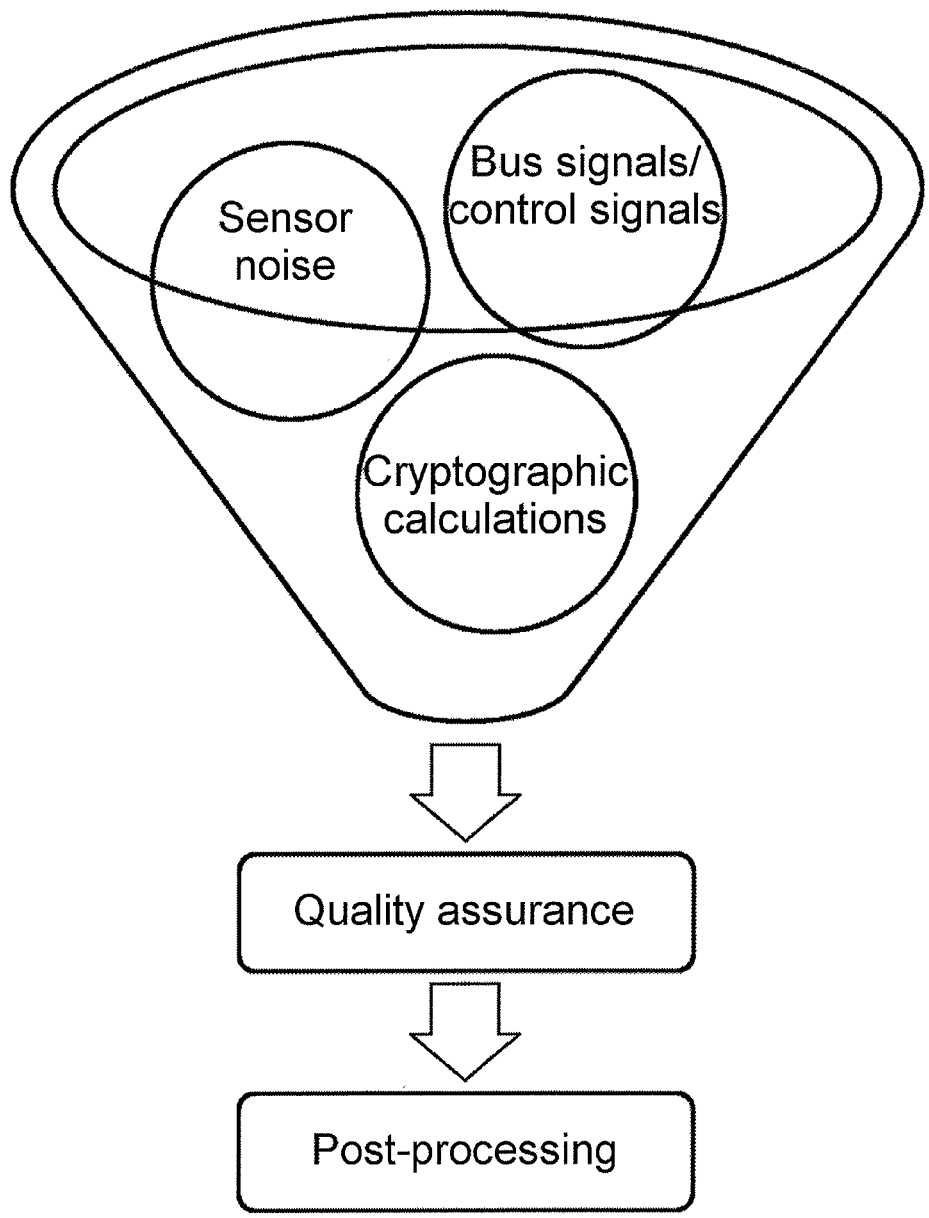
FIG. 3 shows a schematic illustration of the generation of random numbers by means of a random number generator of the vehicle network according to FIG. 2.

The digital raw data transmitted to the aggregation component 7.1 of the entropy pool 7 must be preprocessed and qualified for suitability as a random number, as schematically indicated with FIG. 3. According to FIG. 3, the raw data from the different entropy sources "sensors", "bus signal/control signals" and "cryptographic calculations" are subjected to a quality assurance by using only those raw data which are combined from the different entropy sources and both occur in a non-deterministic manner and contain a minimum amount of entropy as qualified raw data. These qualified raw data are then supplied to post-processing before these qualified and post-processed raw data are stored as random numbers in the storage unit 7.2 in the form of a secure store.

In order to carry out the quality assurance, the raw data which are used and constitute combinations from the different entropy sources are assessed with a particular metric by using the test methods cited below to ensure that the raw data provided by the entropy sources are evenly distributed and do not contain any statistical skew or statistical patterns. The selected metric ensures that the selected raw data occur in a non-deterministic manner and rejects them otherwise. In addition, the collected entropy data are released for further processing only when they contain a certain minimum amount of entropy. For this purpose, the raw data checked for an even distribution are mixed and compressed by means of cryptographic hash functions in order to increase the entropy. All statistical and deterministic online test methods for determining random numbers can generally be used for this purpose. The following test methods can be used for this purpose, for example:

chi-square test, serial test for determining a normal distribution,
minimum test, birthday test, frequency test for determining distribution skews,
rank of matrices test, overlapping sum test for detecting repetitive patterns, and
correlation test, Kolmogrov-Smirnov test for determining distribution similarities which do not correspond to the normal distribution.

In order to post-process these raw data qualified in this manner, they are converted, by means of a cryptographic one-way function, into an aggregated data block which is used as a random number. All cryptographic hash functions and one-way functions based on block cipher mode constructions can be used for this purpose. In the case of a one-way function f, there is virtually no method which can be carried out in order to find the associated x value from a given function value f(x) of this function.

Such cryptographic one-way functions are, for example:
hash function with all arbitrary bit lengths, such as:
SHA-1
SHA-2
SHA-3
SHAKE
RIPEMD
Photon
Spongent, or
block cipher mode constructions (independent of the block cipher used), such as:
Davies-Meyer construction
Matyas-Meyer-Oseas construction
Miyaguchi-Preneel construction.

The last preprocessing step of the raw data received from the entropy sources involves securely storing the random numbers generated as an aggregated data block in the storage unit 7.2 of the entropy pool 7. The secure storage must ensure the confidentiality and integrity of the random numbers until they are used in the control units 4 and 5 in the form of consumers. This can be ensured by using encryption algorithms with a special operating mode. An operating mode is a particular way, of using a block cipher which describes the processing of one or more plain text(s) and cipher block(s) using the cryptographic algorithm. The different operating modes are cited in the next paragraph:

block cipher with a special operating mode independent of the block cipher, for example:
SIV mode
CCM mode
CMAC message authentication mode
CBC-MAC
O-MAC
P-MAC
authenticated encryption schemes, for example:
All current subscribers of the Caesar contest (https://competitions.cr.yp.to/caesar.html)
GCM mode
OCB mode
asymmetrical signature and encryption methods, for example:
ECIES
DSA
ECDSA
RSA The random numbers generated in this manner are held in the storage unit 7.2 for distribution to the consumers (that is to say control units with a random number collector) by the distribution component 7.3.

The distribution component 7.3 ensures that the generated random numbers are distributed to the random number collector components of the consumers and blocks further output if the storage unit 7.2 having current random numbers is empty. The distribution component 7.3 also ensures that random numbers are transmitted only once to the control units 4 and 5 as consumers, thus preventing repeated use of random numbers.

The invention claimed is:

1. A method for providing random numbers for control units communicating via a vehicle network of a vehicle, of the method comprising:
   a) providing a random number generator within the vehicle which is connected to the vehicle network for the purpose of transmitting random numbers to the control units within the vehicle, wherein the random number generator has a storage unit,
   b) forming the control units each with at least one entropy source such that the vehicle network includes entropy sources, wherein raw data generated by the entropy sources are each generated based on different vehicle signals,
   c) providing the raw data from the entropy sources to a control unit of the control units,
   d) carrying out, by the control unit, a quality assurance of the raw data from the entropy sources by:
      combining the raw data,
      performing statistical analysis on the combined raw data from the entropy sources to determine an amount of entropy in the combined raw data from the entropy sources, determining that the combined raw data are qualified raw data when the combined raw data is determined by the statistical analysis to occur in a non-deterministic manner and contain the amount of entropy that is at least a minimum amount of entropy, and determining that the combined raw data is rejected raw data when the combined raw data is determined by the statistical analysis to not occur in a non-deterministic manner and not contain the amount of entropy that is the minimum amount of entropy, e) excluding, by the control unit, the rejected data and post-processing, by the control unit, the qualified raw data by converting them into an aggregated data block by a cryptographic one-way function, f) securely storing the aggregated data block as a random number in the storage unit, and g) transmitting a random number stored in the storage unit to at least one other control unit of the control units via the vehicle network.

2. The method as claimed in claim 1, in which each random number is transmitted only once according to method step g.

3. The method as claimed in claim 1, in which the random number generator is also formed with at least one entropy source of the entropy sources using method step b.

4. The method as claimed in claim 1, according to which the measurement inaccuracies of sensors used in the vehicle are used as the entropy sources.

5. The method as claimed in claim 4, according to which an engine speed sensor and/or a sensor capturing the steering movements of a steering wheel of the vehicle and/or a radar sensor and/or at least one light sensor and/or a sensor capturing the position of the brake pedal of the vehicle is/are used as the sensors.

6. The method as claimed in claim 4, in which the measurement inaccuracies of the sensors are measured and are digitized as a bit number, wherein n least significant bits of the bit number are used as the raw data.

7. The method as claimed in claim 1, in which bus signals from a data bus of the vehicle and/or control signals from a control system of the vehicle are used as the entropy sources.

8. The method as claimed in claim 7, in which a period between two non-periodic messages of the same type on the data bus is used as the at least one entropy source of the entropy sources.

9. The method as claimed in claim 1, in which results of the cryptographic one-way function are used as the at least one entropy source of the entropy sources.

10. The method as claimed in claim 9, in which hash sums and/or message authentication codes, signatures and/or encrypted data are used as the cryptographic one-way function.

11. The method as claimed in claim 1, in which the quality assurance according to method step d is carried out using statistical analysis methods.

12. The method as claimed in claim 1, in which the storage of the aggregated data block according to method step f is carried out as secure storage using an encryption algorithm having a predefined operating mode.

13. A vehicle network of a vehicle for providing random numbers, having a plurality of communicating control units, comprising:

a random number generator within the vehicle for the purpose of transmitting random numbers to the control units within the vehicle, wherein the random number generator has an aggregation component, a storage unit, the control units each with at least one entropy source such that the vehicle network includes entropy sources, wherein raw data generated by the entropy sources are each generated based on different vehicle signals, a control unit of the control units, the control unit configured to:

receive the raw data from the entropy sources, combine the raw data, performing statistical analysis on the combined raw data from the entropy sources to determine an amount of entropy in the combined raw data from the entropy sources, determine that the combined raw data are qualified raw data when the combined raw data is determined by the statistical analysis to occur in a non-deterministic manner and contain the amount of entropy that is at least a minimum amount of entropy, determine that the combined raw data is rejected raw data when the combined raw data is determined by the statistical analysis to not occur in a non-deterministic manner and not contain the amount of entropy that is the minimum amount of entropy, exclude the rejected data and post-process the qualified raw data, according to which the latter is converted into an aggregated data block by a cryptographic one-way function and this aggregated data block is stored as a random number in the storage unit, and transmit a stored random number to at least one other control unit of the control units via the vehicle network.

14. The vehicle network as claimed in claim 13, in which the random number generator is formed with at least one entropy source of the entropy sources.

15. The vehicle network as claimed in claim 13, in which the at least one entropy source of the entropy sources of the control unit is arranged in an entropy agent, wherein the entropy agent is connected to the control unit via a unidirectional communication connection.

16. The vehicle network as claimed in claim 14, in which the at least one entropy source of the entropy sources of the random number generator is arranged in an entropy agent which is connected to the control unit via a unidirectional communication connection.

17. The vehicle network as claimed in claim 13, in which at least one control unit has a random number collector which is connected to the random number generator for the purpose of transmitting the random number via a unidirectional communication connection.

18. The vehicle network as claimed in claim 13, in which the at least one entropy source is a sensor of the vehicle.

19. The vehicle network as claimed in claim 13, in which the at least one entropy source is a data bus of the vehicle.

20. The vehicle network as claimed in claim 13, in which the at least one entropy source is a cryptographic calculation unit of the vehicle.

* * * * *